April 15, 1930.  R. T. GRIFFITHS  1,754,624
TIRE PLUGGING METHOD AND MEANS THEREFOR
Filed April 6, 1928  3 Sheets-Sheet 1
Fig.1.
Fig.3.
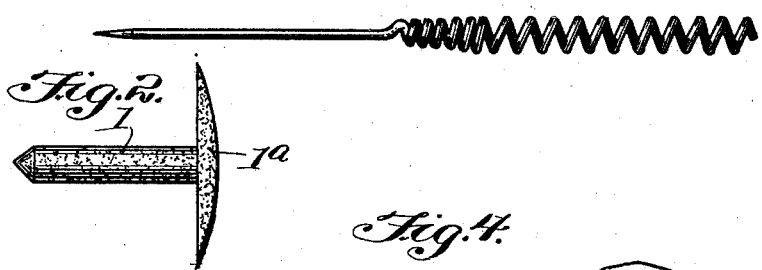
Fig.2.
Fig.4.
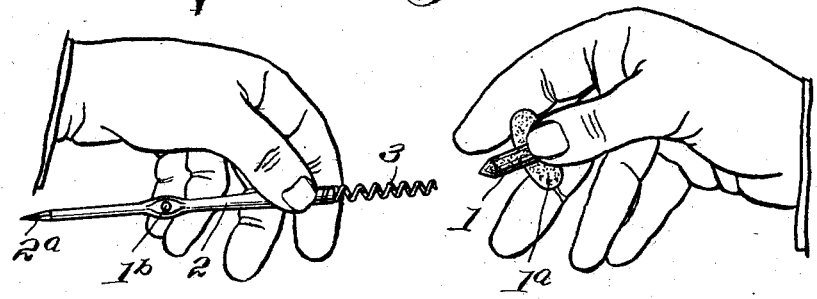
Fig.5.
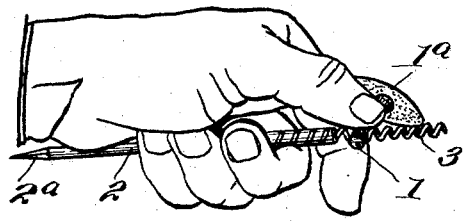
Inventor
Richard T. Griffiths
By Spear Middleton Donaldson & Hall
Attorneys April 15, 1930.  R. T. GRIFFITHS  1,754,624
TIRE PLUGGING METHOD AND MEANS THEREFOR
Filed April 6, 1928   3 Sheets-Sheet 3

Inventor
Richard T. Griffiths
By  Spear Middleton Donaldson & Hall
Attorneys

Patented Apr. 15, 1930

1,754,624

UNITED STATES PATENT OFFICE

RICHARD T. GRIFFITHS, OF AKRON, OHIO, ASSIGNOR TO THE MILLER RUBBER COMPANY, OF AKRON, OHIO, A CORPORATION OF OHIO

TIRE-PLUGGING METHOD AND MEANS THEREFOR

Application filed April 6, 1928. Serial No. 267,985.

My invention concerns an improved method of and means for inserting plugs in the punctures or holes in pneumatic tire casings, such for example as are caused by the penetration of nails and like articles.

The invention aims to provide a method of and means for inserting such plugs in the punctures in a more expeditious manner and in which the plug will have a tighter fit when in place and effect a more expeditious seal.

The invention also aims to provide a method of and means for inserting the plug without unduly enlarging the puncture.

The invention also aims to provide a method and means by which a plug may be inserted in a hole or puncture of less diameter than the normal diameter of the plug without enlarging said hole.

The invention includes the novel method and means hereinafter described and particularly defined by the appended claims.

In order that the invention may be thoroughly understood reference is made to the accompanying drawings in which:

Fig. 1 is a side elevation of the preferred form of the plug inserting device forming a part of my said invention.

Fig. 2 is a view of the customary type of plug.

Fig. 3 is a view of a modification.

Figure 6:
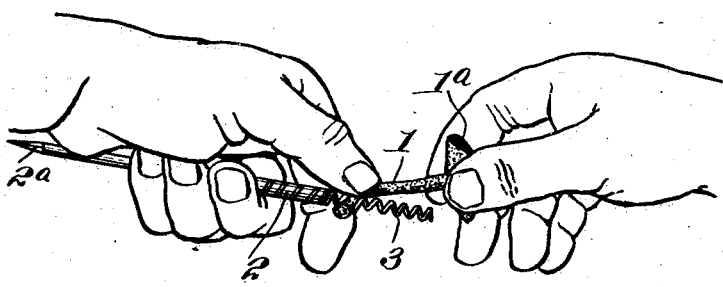

Figs. 4 to 12 inclusive are perspective views showing the method of procedure.

Referring by reference characters to these drawings the numeral 1 designates the plug generally used having a disk or head 1ª and a cylindrical shank or plug proper, to which the lead line of numeral 1 extends, the said shank being designed for insertion in the puncture or hole and the cap, head or disk 1ª to lie against the inner face of the tire casing around the puncture. 2 designates a plug inserting needle having a tapered end portion preferably terminating in a point 2ª of non-circular form (square in cross section for example) enabling the needle point to be more readily worked into the puncture by a rotary motion.

At the other end, which is preferably cylindrical, is secured a wire helix 3 which is in axial alinement with the needle. This may be secured to the needle in any desired manner but I prefer to provide the cylindrical part adjacent the end with a helical groove in which a portion of the helix is seated and rigidly secured by brazing, welding or the like. In practice the helix should not be larger than the plug portion 1 (in diameter) and may be less.

The intermediate part of the needle is preferably provided with a hole 1ᵇ through which a wire nail or like device may be inserted (after the needle has penetrated the tire) for convenience in pulling the plug into place as will hereinafter appear.

In carrying out my invention the needle 2 is grasped in the left hand as shown in Fig. 4 and the plug in the right, whereafter the pointed end of the plug is entered in the space between two adjacent coils of the helix at a suitable distance from the end, as indicated in Fig. 5, being pressed and held therein by the thumb and forefinger.

The body or shank of the plug is then stretched as indicated in Fig. 6, the disk portion serving as a gripping means for the right hand. Sufficient tension is placed on the plug to cause it to be greatly elongated, this being possible due to its being made of soft elastic rubber, whereby its cross section or diameter is greatly reduced.

Figure 7:
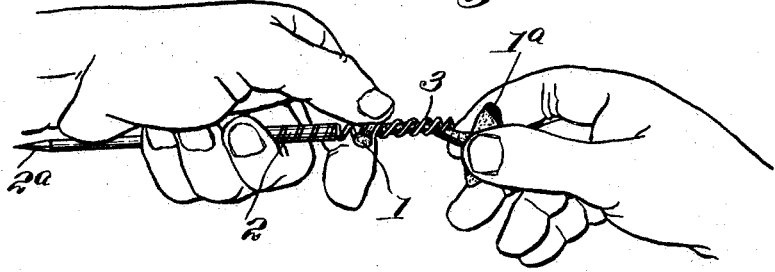
Figure 8:
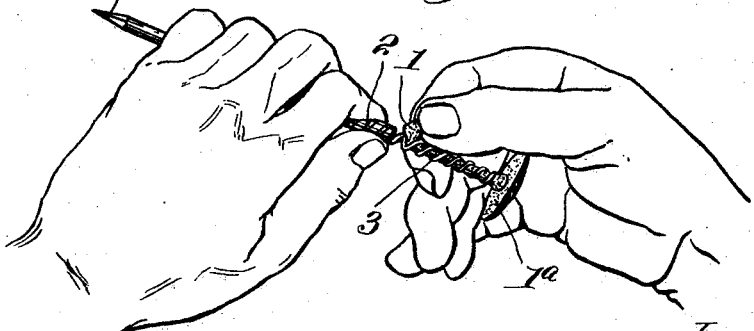

While thus stretched it is wound helically into position within the coils of the helix as indicated by Fig. 7 until it lies wholly within the helix, except the end which was first grasped by the thumb and finger of the left hand (Fig. 5) which end may be pressed in as per Fig. 8.

Figure 9:
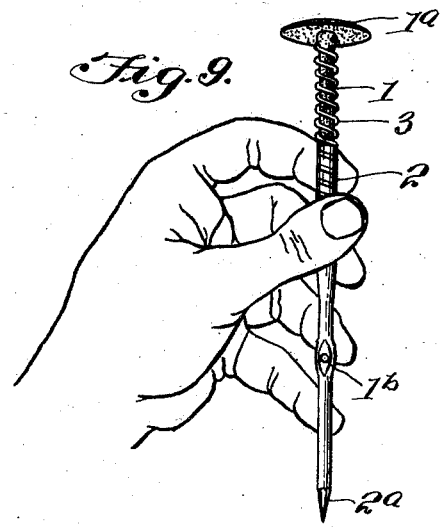
Figure 10:
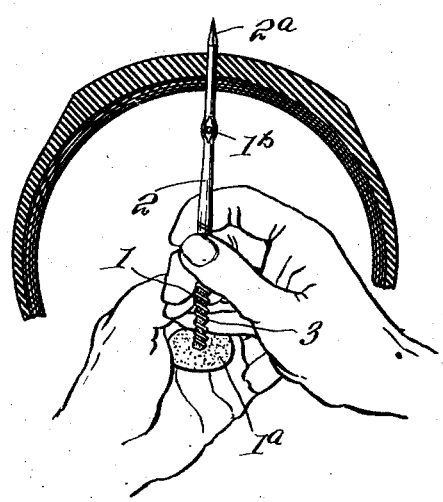
Figure 11:
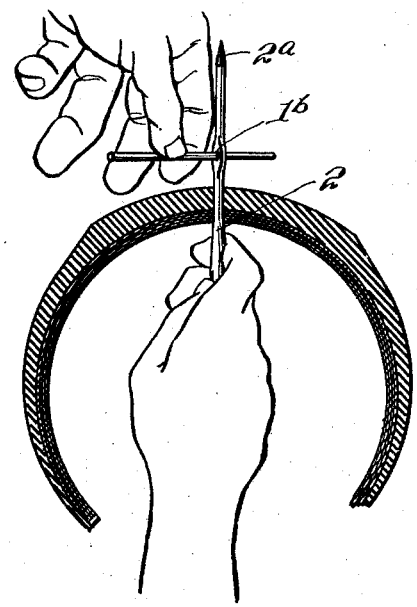
Figure 12:
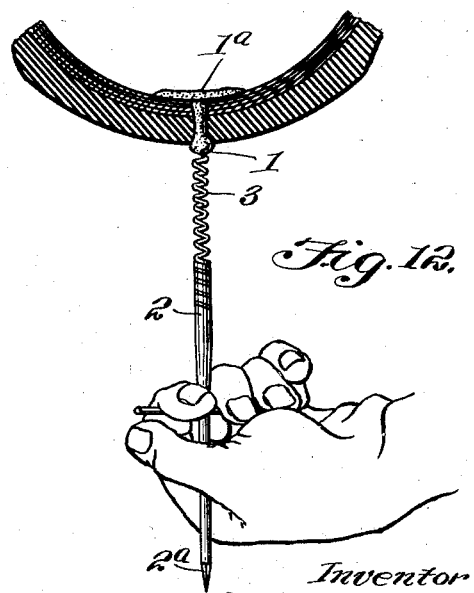

The assembly will then appear as in Fig. 9 and the needle is ready for insertion in the tire as per Fig. 10. After the needle has passed through the tire the wire nail or rod is inserted in the opening in the needle as shown in Fig. 11 and serves as a handle for pulling the needle until the plug enters the tire and its head seats against the inner face thereof whereupon further pull strips the helix from the plug leaving the latter in the tire as per Fig. 12.

It will be understood that the usual application of cement is made for effecting adhesion between the plug and tire.

By this device and method I am not only enabled to expeditiously and effectively enter the plug in the puncture, but can insert a plug of normally larger diameter than the hole or puncture without enlarging the puncture, due to the stretching of the plug with resultant decrease in cross sectional area. It will be understood that the plug is not thus reduced by being compressed, but entirely by the stretching action and is held thus stretched by its engagement with the coils of the helix until the latter is pulled therefrom.

In the form shown in Fig. 3 the needle and helix are made integral, the portion of the helix adjacent the needle proper being more closely coiled and in the form of a spiral or taper to facilitate entrance into the tire, this portion corresponding to the tapered intermediate portion shown in Fig. 1.

Having thus described my invention what I claim is:

1. The method of repairing tire punctures which consists in winding a plug while in stretched condition into the coils of a wire helix, inserting the helix into the puncture while the plug is maintained in stretched condition by the coils of the helix, and thereafter removing the helix from the plug.

2. The method of repairing tire punctures which consists in providing a plug with an end disk and axial shank, winding the shank under tension sufficient to materially stretch the same into the coils of wire helix having an internal diameter which is less than the normal diameter of the shank, inserting the helix in the puncture while the shank is maintained in stretched condition, and removing the helix from the shank.

3. A repair device forming an individual self-contained unit comprising a rubber plug having a head section and an elastic stem section, and a plug inserting needle having a wire helix engaged over said stem section and maintaining said stem section in stretched condition preliminary to insertion in a puncture aperture.

4. Means for inserting plugs in tire casings comprising a needle and a cylindrical wire helix rigidly carried by one end of said needle, said helix comprising a plurality of closely arranged helical coils having a plug receiving opening formed by said coils.

5. Means for inserting plugs in tire casings comprising a needle having a helical groove in one end, and a cylindrical wire helix having a portion seated in said groove and held therein, and a portion projecting beyond the end of the needle and having an axial plug receiving bore.

In testimony whereof, I affix my signature.

RICHARD T. GRIFFITHS.